United States Patent [19]

Hirao et al.

[11] Patent Number: 5,467,863
[45] Date of Patent: Nov. 21, 1995

[54] SORTING SYSTEM HAVING HORIZONTAL TRANSFER APPARATUS

[75] Inventors: Toru Hirao; Hideki Sato, both of Hanno; Toshio Kanbe, Hidaka, all of Japan

[73] Assignee: Tsubakimoto Chain Co.

[21] Appl. No.: 288,391

[22] Filed: Aug. 10, 1994

[30] Foreign Application Priority Data

Aug. 13, 1993 [JP] Japan .................. 5-048265 U

[51] Int. Cl.⁶ .................................................. B65G 47/44
[52] U.S. Cl. ............................................................ 198/360
[58] Field of Search .............................. 198/360, 370.01, 198/370.04, 370.05, 469.4, 680, 687.1; 209/937

[56] References Cited

U.S. PATENT DOCUMENTS

| | | |
|---|---|---|
| 2,776,741 | 1/1957 | Carrier, Jr. . |
| 3,454,148 | 7/1969 | Harrison . |
| 3,499,518 | 3/1970 | Goodpaster . |
| 3,580,378 | 5/1971 | Pedersen . |
| 3,710,711 | 1/1973 | Boehm et al. . |
| 3,799,318 | 3/1974 | Dekoekkoek . |
| 3,807,314 | 4/1974 | Slemmons .......................... 198/465.4 |
| 3,894,625 | 7/1975 | Boyle et al. . |
| 4,903,819 | 2/1990 | Heinold et al. . |
| 4,936,438 | 6/1990 | Waineo . |
| 4,946,023 | 8/1990 | Heinold et al. . |
| 5,076,417 | 12/1991 | Santicchi . |
| 5,125,513 | 6/1992 | Branch . |
| 5,143,201 | 9/1992 | Speckhart et al. . |
| 5,193,686 | 3/1993 | Speckhart et al. . |
| 5,337,883 | 8/1994 | Kuhlmann ............................ 198/465.4 |
| 5,358,090 | 10/1994 | Hirao et al. ......................... 198/370.04 |
| 5,381,885 | 1/1995 | Hirao et al. ......................... 198/465.4 |
| 5,404,992 | 4/1995 | Kobu et al. .......................... 198/465.4 |

FOREIGN PATENT DOCUMENTS 2043569  3/1979  United Kingdom .

Primary Examiner—Joseph E. Valenza
Attorney, Agent, or Firm—Howson and Howson

[57] ABSTRACT

In an apparatus for sorting articles on hangers, a chain pushes articles along an elongated guide rail. The guide rail has a series of gaps, each of which is normally bridged by a pivoted sorting member. At an open gap, the articles are diverted to a horizontal transfer apparatus comprising a rotatable, disc-shaped, article-receiving member. The receiving member conveys articles to the upper end of a downwardly inclined sorting chute. A ridge-shaped, arcuate guide extends along a portion of the perimeter of each receiving member to prevent articles from falling off the receiving member. The horizontal transfer apparatus enable the chutes to be positioned laterally away from the guide rail so that they do not interfere with movement of hangers having horizontal shoulders.

1 Claim, 7 Drawing Sheets

SORTING SYSTEM HAVING HORIZONTAL TRANSFER APPARATUS

BRIEF SUMMARY OF THE INVENTION

This invention relates to apparatus for sorting articles, e.g. articles of clothing on hangers. It is specifically concerned with improvements in a sorting apparatus in which articles are conveyed horizontally on a guide rail and sorted by selectively diverting them to sorting chutes.

In a conventional sorting apparatus, a pawl, driven by a circulating chain, pushes articles along a guide rail. The guide rail has a series of gaps, each of which is normally bridged by a pivoted sorting member. By pivoting a sorting member to open a gap in the guide rail, an article can be diverted to a sorting chute. A typical sorting apparatus has a plurality of sorting chutes, each meeting the guide rail at a junction point adjacent to a gap, and extending both downwardly and laterally from the guide rail. In the operation of the conventional sorting apparatus, articles travel along the guide rail until they reach an open gap. At the open gap, the articles are diverted to a sorting chute.

Hangers having arms which extend in a substantially horizontal direction, especially hangers for supporting trousers, skirts, etc., tend to collide with sorting chutes as they travel across the guide rail. This restricts the kinds of articles which can be sorted by a conventional apparatus to those which can be supported on hangers having drooping shoulders, e.g. hangers for supporting shirts, jackets, etc.

The principal object of this invention is to provide an apparatus which is not subject to the collision problem mentioned above. It is also an object of the invention to provide a sorting apparatus which is capable of handling a wide variety of objects on various types of hangers.

A preferred sorting apparatus in accordance with the invention comprises an elongated guide rail and means which pushes articles along the guide rail. The guide rail has a series of gaps spaced along its length. Sorting members, which normally bridge the gaps, are pivotable downwardly to open the gaps. At an open gap, the articles are diverted to a rotatable, disc-shaped, article-receiving member, which is disposed beneath the sorting member. The article-receiving member conveys articles to the upper end of a downwardly inclined sorting chute. A guide in the form of a ridge extends in an arc along a portion of the perimeter of each receiving member, from a position beneath the pivotable sorting member to a position adjacent to an end of the corresponding sorting chute. The guide prevents articles from falling off the article-receiving member. By conveying articles horizontally away from the guide rail, the disc-shaped article-receiving member allows the sorting chute to be spaced laterally from the guide rail. This makes it possible for various kinds of hangers, including hangers having horizontal shoulders, to travel along the guide rail without colliding with the sorting chutes.

Further objects, details and advantages of the invention will be apparent from the following detailed description, when read in conjunction with the drawings.

DETAILED DESCRIPTION

Figure 5:
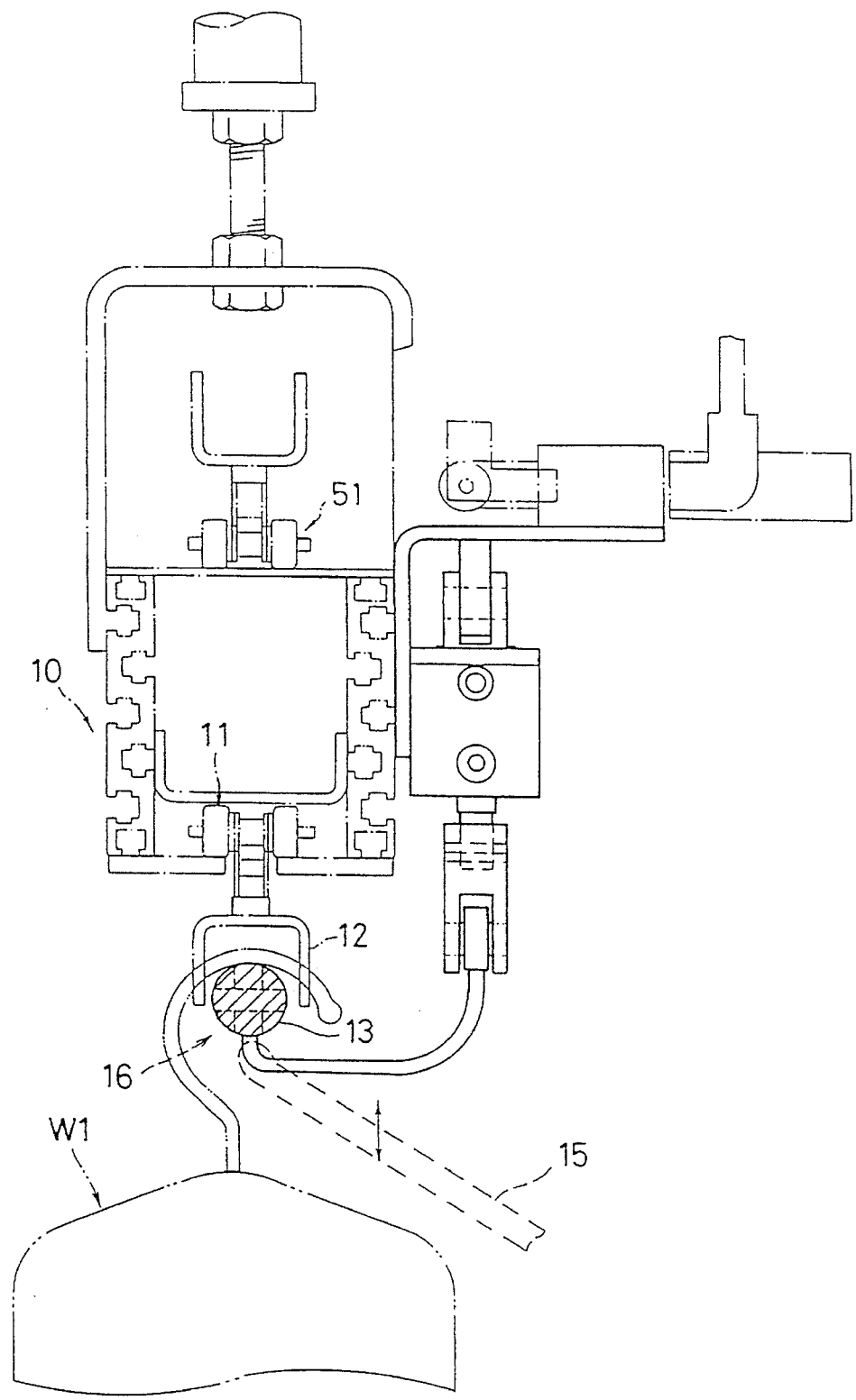
FIG. 5 is a sectional view of a conventional sorting apparatus.
Figure 6:
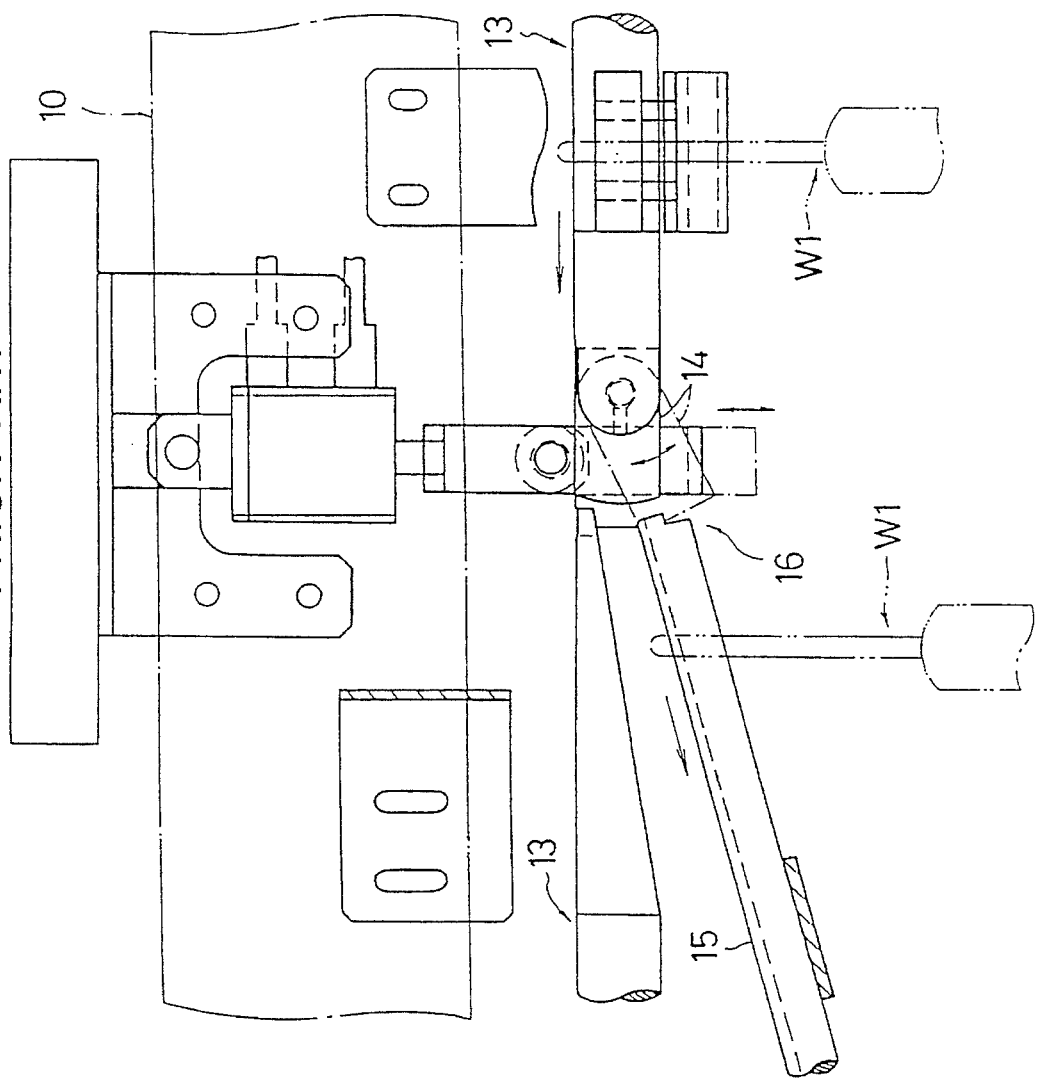
FIG. 6 is a fragmentary side elevational view showing a conventional sorting junction.
Figure 7:
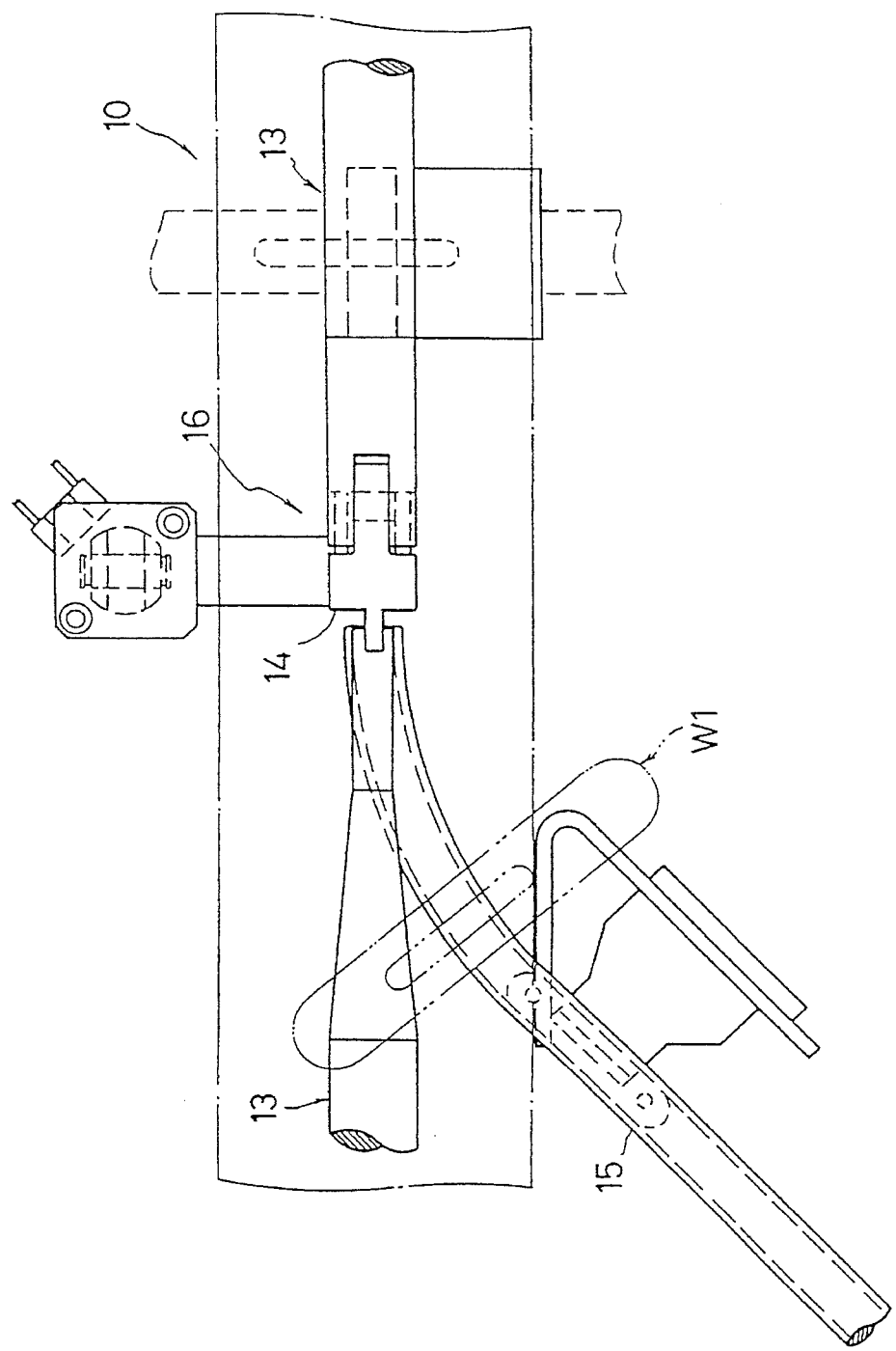
FIG. 7 is a fragmentary top plan view showing a conventional sorting junction.

In a conventional sorting apparatus, as shown in FIGS. 5, 6, and 7, a pawl 12, driven by a circulating chain 11, pushes articles, which are supported on hangers, e.g. article W1 in FIG. 5, along a guide rail 13. The guide rail 13 has a series of gaps, each of which is normally bridged by a pivoted sorting member 14. The sorting member of each gap is pivoted to the guide rail at the upstream end of the gap, referring to the direction of travel of articles along the guide rail. By pivoting a sorting member 14 to open a gap in the guide rail 13, an article can be diverted to a sorting chute 15.

The sorting member 14 and chute 15 meet at a sorting junction 16. In a typical sorting apparatus a series of sorting junctions 16 is provided along the guide rail 13, the number of such junctions depending on sorting requirements.

An article on a hanger travels along the guide rail, passing over sorting members 14 until it reaches a junction 16 at which the sorting member pivots downwardly so that the gap in the guide rail is open. At this junction, the article is transferred directly to a sorting chute 15.

Hangers having arms which extend in a substantially horizontal direction, e.g. hangers for supporting trousers, skirts, etc., tend to collide with sorting chutes 15 as they travel along the guide rail 13. This restricts the kinds of articles which can be sorted by a conventional apparatus to those which can be supported on hangers having drooping shoulders, e.g. hangers designed for supporting shirts, jackets, etc.

Figure 1:
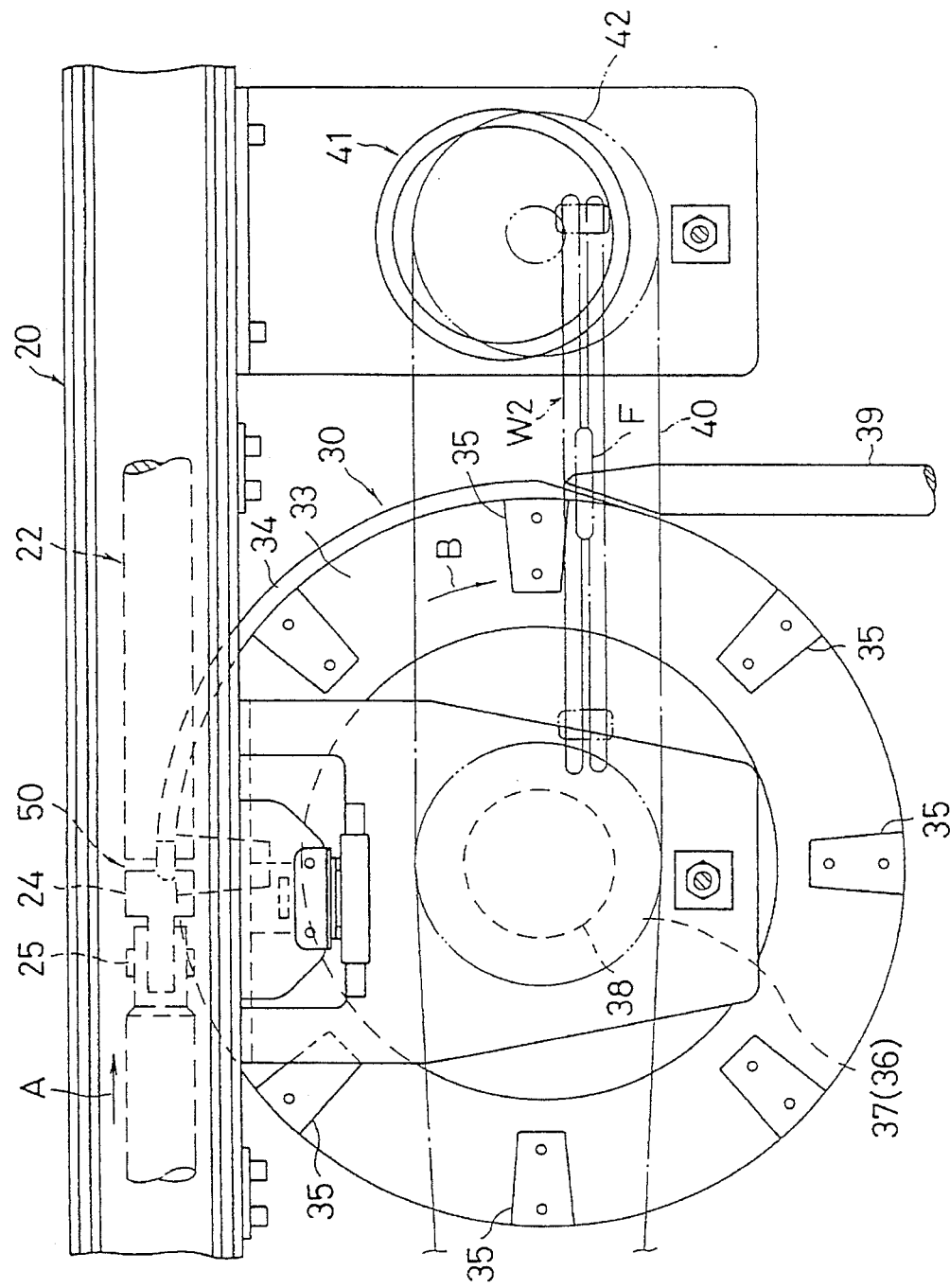
FIG. 1 is a fragmentary top plan view of a conveyor having a horizontal transfer apparatus in accordance with the invention.
Figure 2:
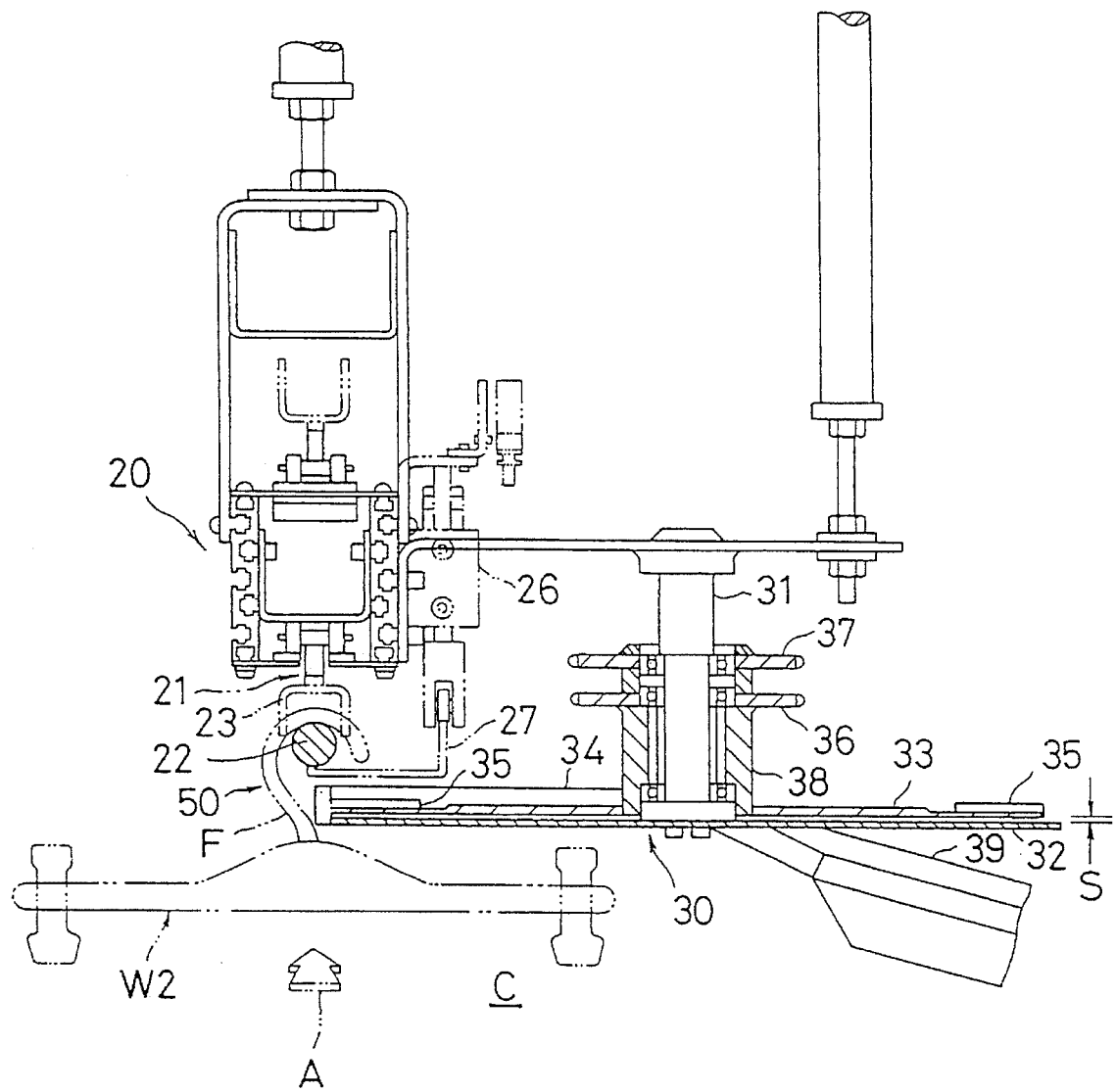
FIG. 2 is a an elevational view, partly in section, of the apparatus as seen from the left side of FIG. 1.

In the sorting apparatus 20 in accordance with the invention, shown in FIGS. 1, 2, 3, and 4, a guide rail 22 shown in FIG. 2 is suspended from a ceiling. A circulating chain 21 is arranged to travel parallel to the guide rail 22. A belt may be employed in place of a chain 21.

Pawls 23 are provided at intervals along the chain 21. The pawls engage the hooks of hangers, and push the articles along the guide rail 22.

Sorting members 24 are disposed, at sorting junctions 50, in the gaps between adjacent sections of the guide rail 22.

The sorting members 24 are pivoted to the guide rail on horizontal pins 25 at the upstream ends of the gaps. The sorting members tilt from a horizontal position to a downwardly sloping position. When the sorting members 24 extend horizontally, they cooperate with the guide rail 22 to provide a continuous guide on which the hangers can slide. The sorting members 24 are connected to the operating rod 27 of a pneumatic cylinder 26, and pivot downwardly when the operating rods 27 are extended.

A horizontal transfer apparatus 30 is positioned beneath each sorting member 24. Each horizontal transfer apparatus 30 is supported by a vertically extending support shaft 31, and comprises a stationary disc 32, a rotatable disc 33, a guide member 34, multiple hanger-engaging stops 35, and a pair of sprockets 36 and 37.

The stationary disc 32 is rigidly secured to the lower end of the support shaft 31.

The rotatable disc 33 is secured to the lower end of a cylinder 38. The cylinder 38 is rotatable on the support shaft 31. The rotatable disc 33 is disposed in a horizontal plane above the stationary disc 32, and separated from the stationary disc 32 by a small gap.

A guide 34, shown in FIG. 1, in the form of an arcuate ridge, is provided on the perimeter of the stationary disc 32. The guide 34 extends, through an arc of approximately ninety degrees, from beneath the sorting member 24 to a point adjacent to the upper tip of a downwardly inclined sorting chute 39.

Eight hanger stops 35 are secured to the upper surface of the rotatable disc 33. The stops 35 engage the tips of the hooks of the hangers.

Figure 3:
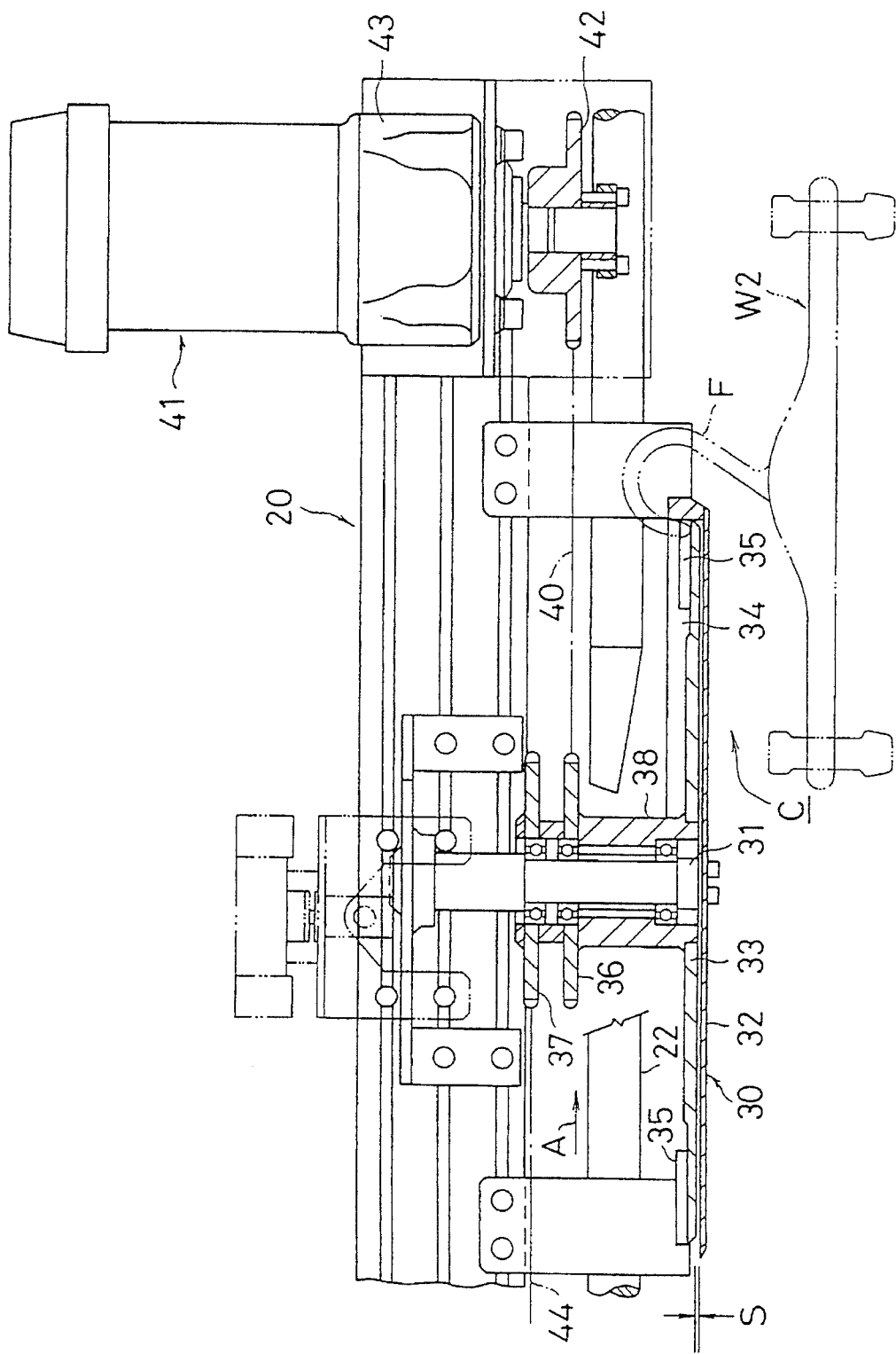
FIG. 3 is a fragmentary elevational view, partly in section, of the apparatus as seen from the bottom of FIG. 1, with the sorting junction partially broken away.
Figure 4:
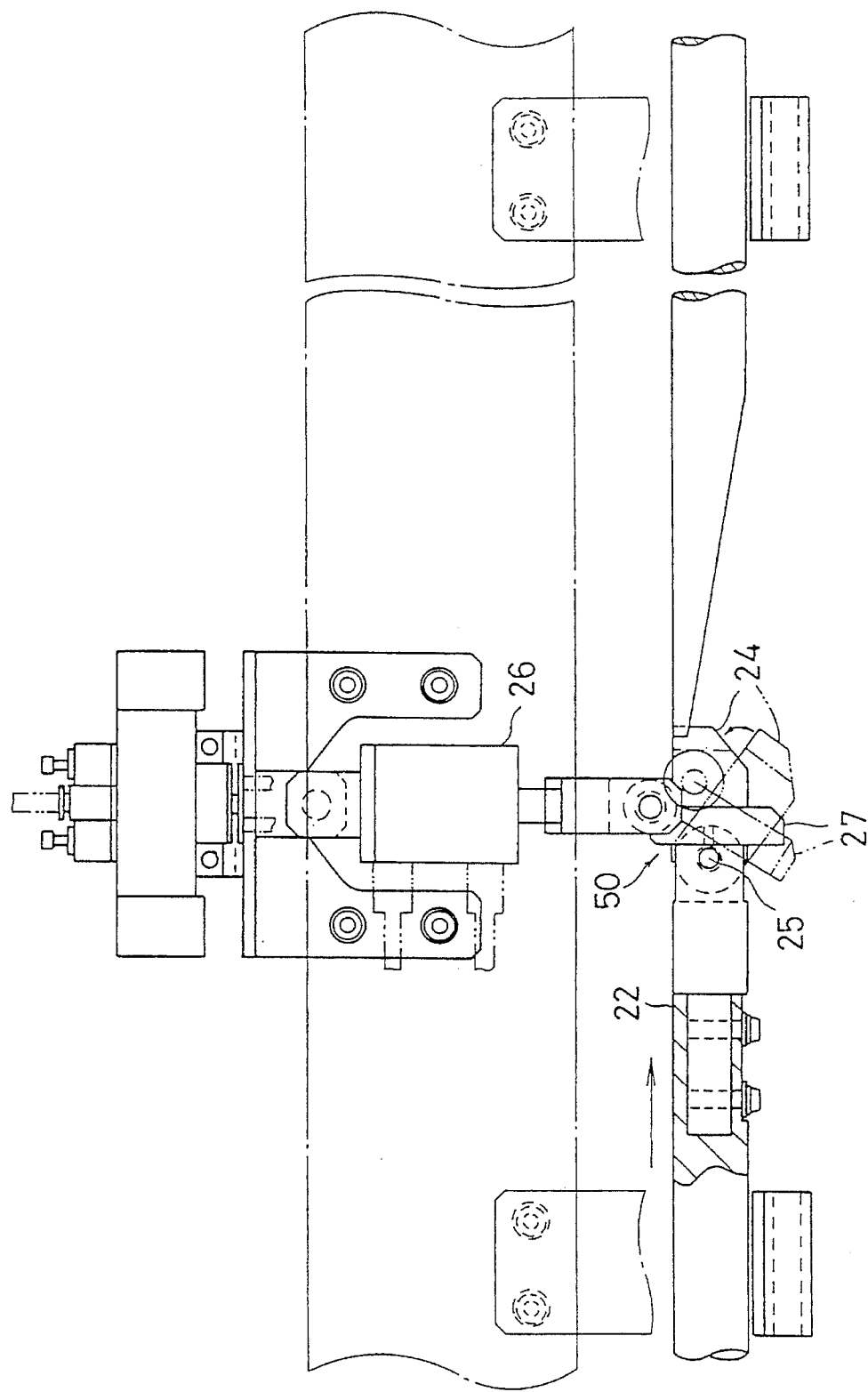
FIG. 4 is a fragmentary side elevational view of a sorting junction.

Sprockets 36 and 37, shown in FIG. 3, are secured to the rotatable cylinder 38 and separated by a gap. Another sprocket 42, attached to the output shaft of a speed reducer 43, driven by a motor 41, is connected to sprocket 36 by a transmission chain 40. Sprocket 37 is connected to a sprocket connected to the rotatable cylinder of another horizontal transfer apparatus (not shown) by a chain 44.

The sorting chute 39 shown in FIGS. 1 and 2 is supported by the stationary disc 33 so that the tip of the sorting chute 39 is adjacent to the perimeter of the rotatable disc 33. The sorting chute 39 is inclined downwardly from the stationary disc 32.

In the operation of the improved sorting apparatus just described, pawls 23, driven by a circulating chain 21, push articles along the guide rail 22 in the direction indicated by arrow A in FIGS. 1 and 2.

The hangers W2 are arranged on guide rail 22 with the openings of their hooks F facing the horizontal transfer apparatus 30, as shown in FIGS. 2 and 3.

When the operating rod 27 of a pneumatic cylinder 26 pivots a sorting member 24 downwardly to open a gap in the guide rail 22, a hanger reaching the open gap slides down the sorting member 24 and is discharged onto the rotatable disc 33. The hook of the hanger engages the rotatable disc, straddling the ridge-shaped guide member 34. The rotatable disc 33 rotates in the direction indicated by arrow B in FIG. 1, and conveys the article from a position beneath the sorting member 24 to the upper tip of the sorting chute 39.

Stops 35, on the rotatable disc 33, engage the tips of the hooks, causing the hangers to be carried through a ninety degree arc along the guide member 34. As the hangers are transferred by the disc 33, guide member 34 prevents them from falling off the rotatable disc 33.

The articles are delivered by disc 33 to the downwardly inclined sorting chute 39, and slide down the chute.

The horizontal transfer apparatus provides a large open space C as shown in FIGS. 2 and 3. The horizontal transfer apparatus, incorporating rotatable disc 33, conveys articles horizontally away from the guide rail 22. It does not interfere with the movement of hangers which have horizontal shoulders, and it allows the chutes to be spaced laterally from the guide rail so that they do not interfere with the movement of the hangers. Consequently, the sorting apparatus is able to handle articles on various types of hangers, including hangers having horizontal shoulders, without collision.

Various modifications can be made to the apparatus described herein without departing from the scope of the invention as defined in the following claims.

We claim:

1. An apparatus for sorting articles on hangers, said apparatus comprising means which moves articles along an elongated guide rail, said guide rail having at least one gap, a pivotable sorting member normally bridging said gap, said sorting member being pivotable downwardly to open the gap, means comprising a sorting chute for receiving articles from said guide rail when said sorting member is pivoted downwardly, and a horizontal transfer apparatus comprising:

means, comprising a horizontally extending, rotatable, disc-shaped, article-receiving member, disposed beneath the pivotable sorting member, for conveying an article horizontally from said sorting member to said sorting chute; and ridge-shaped guide means extending along a portion of the perimeter of the disc-shaped article-receiving member, from a position beneath said pivotable sorting member to a position adjacent to the sorting chute, for preventing articles from falling off the disc-shaped article-receiving member.

* * * * *